US008194566B2

(12) United States Patent
Gobara et al.

(10) Patent No.: US 8,194,566 B2
(45) Date of Patent: Jun. 5, 2012

(54) INFORMATION PROCESSING DEVICE, AND BUBBLE PACKET TRANSMISSION METHOD AND PROGRAM

(75) Inventors: Kunio Gobara, Osaka (JP); Hajime Maekawa, Osaka (JP)

(73) Assignee: Panasonic Corporation, Osaka (JP)

( * ) Notice: Subject to any disclaimer, the term of this patent is extended or adjusted under 35 U.S.C. 154(b) by 1116 days.

(21) Appl. No.: 10/590,596

(22) PCT Filed: Apr. 15, 2005

(86) PCT No.: PCT/JP2005/007296
§ 371 (c)(1),
(2), (4) Date: Aug. 24, 2006

(87) PCT Pub. No.: WO2005/109785
PCT Pub. Date: Nov. 17, 2005

(65) Prior Publication Data
US 2007/0171835 A1    Jul. 26, 2007

(30) Foreign Application Priority Data

May 7, 2004    (JP) .................................. 2004-138222

(51) Int. Cl.
*H04L 12/28*    (2006.01)
(52) U.S. Cl. ........ 370/254; 370/401; 709/220; 709/227; 709/249
(58) Field of Classification Search .................. None
See application file for complete search history.

(56) References Cited

U.S. PATENT DOCUMENTS

| 5,675,741 A * | 10/1997 | Aggarwal et al. ............. 709/242 |
| 6,687,732 B1 * | 2/2004 | Bector et al. .................. 709/200 |
| 6,952,421 B1 * | 10/2005 | Slater ........................... 370/401 |
| 2003/0152034 A1 * | 8/2003 | Zhang et al. .................. 370/252 |
| 2004/0028035 A1 * | 2/2004 | Read ............................. 370/352 |
| 2004/0052257 A1 | 3/2004 | Abdo et al. |

OTHER PUBLICATIONS

International Search Report for Application No. PCT/JP2005/007296, dated Jul. 26, 2005.
C. Huitema, "Teredo: Tunneling IPv6 over UDP through NATs," [online], draft-huitema-v6ops-teredo-00.txt, [retrieval date Jul. 12, 2005], Jun. 6, 2003, Internet URL:http://www.watersprings.org/pub/id/draft-huitema-v6ops-teredo-00.txt.
Masanori Kusunoki, "Windows XP Native P2P Module ni Semaru," SoftwareDesign No. 158, Dec. 18, 2003, with English translation.
Supplementary European Search Report for Application No. EP 05 73 0504, dated Mar. 26, 2012, Panasonic Corporation.

* cited by examiner

*Primary Examiner* — Brian Roberts
(74) *Attorney, Agent, or Firm* — RatnerPrestia (57) ABSTRACT

A first information-processing device at a communication source, is equipped with span of packet life setting part and bubble packet transmitter. The span of packet life setting part sets a span of packet life in a range where a bubble packet transmitted for leaving a transmission history in a NAT at the communication source so that a packet transmitted from the information-processing device at the communication destination, does not reach the information-processing device at the communication destination. Meanwhile, bubble packet transmitter transmits a bubble packet having the span of packet life set by span of packet life setting part through the NAT at the communication source. With such a configuration, the present invention provides an information-processing device that appropriately establishes communications through a NAT with high-level security.

12 Claims, 6 Drawing Sheets

First information-processing device1

FIG. 9 PRIOR ART

INFORMATION PROCESSING DEVICE, AND BUBBLE PACKET TRANSMISSION METHOD AND PROGRAM This Application is a U.S. National Phase Application of PCT International Application PCT/JP2005/007296.

TECHNICAL FIELD

The present invention relates to an information-processing device and the like that communicate with the other information-processing devices.

BACKGROUND ART

Figure 9:
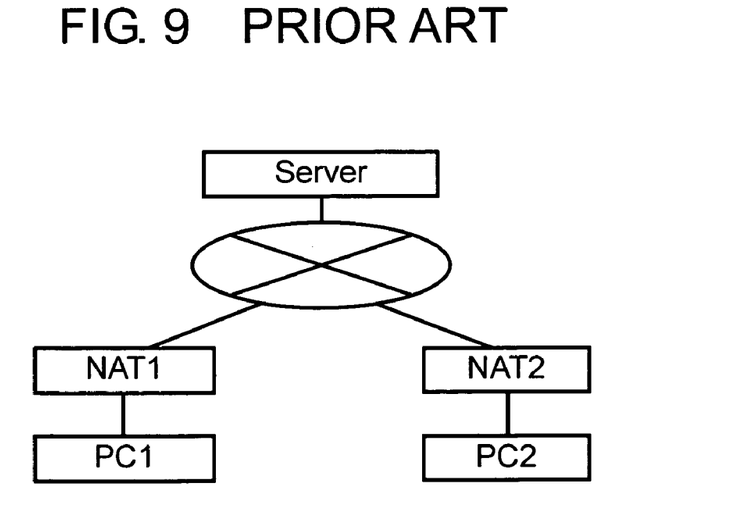
FIG. 9 illustrates an example of a conventional communication system.

A technology has been conventionally developed that performs communications, such as peer-to-peer, directly between information-processing devices, not via a server. In such communications, as shown in FIG. 9, information-processing devices PC1 and PC2 may communicate through NAT1 and NAT2, respectively. Here, NAT1 and NAT2 convert mutually between a private IP address at the local side (information-processing device) and a global IP address at the communication line side. NAT1, NAT2, etc. include a port allocation rule and intercepting filter rule, and NATs are classified according to a combination of these rules. Specifically, the transmission port allocation rule has three types. One is Cone type, where, if an IP address identifying a specific information-processing device is allocated to a port at the local (e.g. LAN) side of a NAT, a port at the global side (e.g. WAN such as the Internet), allocated to the NAT corresponding to the port at the local side, is also specified, independently of the destination (the IP address and port number) of a packet. Another is Address Sensitive type, where a new port number is allocated for each destination address of a packet. The other is Port Sensitive type, where a new port number is allocated for each destination port of a packet. Meanwhile, the intercepting filter rule, which judges if a packet can be received at the global side through the port where the packet has been transmitted from the local side of the NAT, has three types. One is Address Sensitive filter, where a packet is received only through the address with which the packet has been transmitted from the port. Another is Port Sensitive filter, where a packet is received only through a port through which the packet has been transmitted. The other is No filter, where a filter does not exist, but all packets are received.

In such communications via a NAT, if packets are not transmitted from the LAN side to the WAN side of the NAT, packets from other information-processing devices at the WAN side cannot be accepted. If the intercepting filter rule for the NAT particularly uses Address Sensitive filter or Port Sensitive filter, unless packets have not been transmitted to an information-processing device at the WAN side or to a given port of the information-processing device, packets transmitted from the information-processing device at the WAN side can not be accepted. Therefore, in order to establish communications between information-processing devices via the NAT, transmitting packets (bubble packet) for leaving a transmission history and other operations have been made.

These technologies are described in "STUN-Simple Traversal of User Datagram Protocol (UDP) Through Network Address Translators (NATs)" by J. Rosenberg, J. Weinberger, C. Huitema, and R. Mahy, online: March, 2003, retrieved: Mar. 17, 2004, URL: ietf.org/rfc/rfc3489.txt; and "Advanced Network Pack for Windows (registered trademark) explained Part 1 Teredo enables more transparent IPv6 connection" by Takuya Oikawa, online: Sep. 29, 2003, retrieved: Mar. 17, 2004, URL: ipv6style.jp/jp/tryout/20030929/2.shtml.

However, some types of NATs regard as an offensive a packet rejected due to an intercepting filter rule, and refuse a packet transmitted from the IP address for the communication source of the packet, to improve security level. In such a case, as a result of transmitting a bubble packet to the destination NAT, the bubble packet is regarded as an offensive. Consequently, the NAT that has received the bubble packet results in refusing any packet from the information-processing device that has transmitted the bubble packet, and may fails to appropriately establish communications between the information-processing devices at the source and destination of the bubble packet.

Further, a bubble packet is transmitted for leaving a transmission history in the source NAT so that it can appropriately receive a packet transmitted from the destination. Therefore, a bubble packet is not usually transmitted for transmitting information. It is not desirable that such packets, not for transmitting information, increase communication traffic on communication lines such as the Internet.

SUMMARY OF THE INVENTION

The present invention is to solve the above-mentioned problem. One of its purposes is to provide an information-processing device and the like that appropriately establishes communications via a communication control device (e.g. NAT) with high-level security.

Another purpose of the present invention is to provide an information-processing device and the like that transmit bubble packets while preventing communication traffic on communication lines from increasing.

In order to achieve the above-mentioned purposes, the present invention provides a source information-processing device that communicates with a destination information-processing device through a source communication control device. The source information-processing device is equipped with a span of packet life setting part and a bubble packet transmitter. The span of packet life setting part sets a span of packet life, a time range in which a bubble packet transmitted from the source information-processing device for leaving a transmission history in the source communication control device, does not reach the destination information-processing device. The bubble packet transmitter transmits a bubble packet including a span of packet life that the span of packet life setting part has set, via the source communication control device.

By means of an information-processing device according to the present invention, setting a given span of packet life to a bubble packet allows appropriately establishing communications via a communication control device with high-level security. Further, providing a bubble packet with a span of packet life enables preventing communication traffic on communication lines from increasing.

REFERENCE MARKS IN THE DRAWINGS

1 First information-processing device
2 Second information-processing device
3 First communication control device
4 Second communication control device
5 Server
11 Communication control unit
12 Relay node counter
13 Span of packet life setting part
14 Bubble packet transmitter

DETAILED DESCRIPTION OF PREFERRED EMBODIMENTS

Exemplary Embodiment

A description is made for a communication system according to an embodiment of the present invention, referring to drawings.

Figure 1:
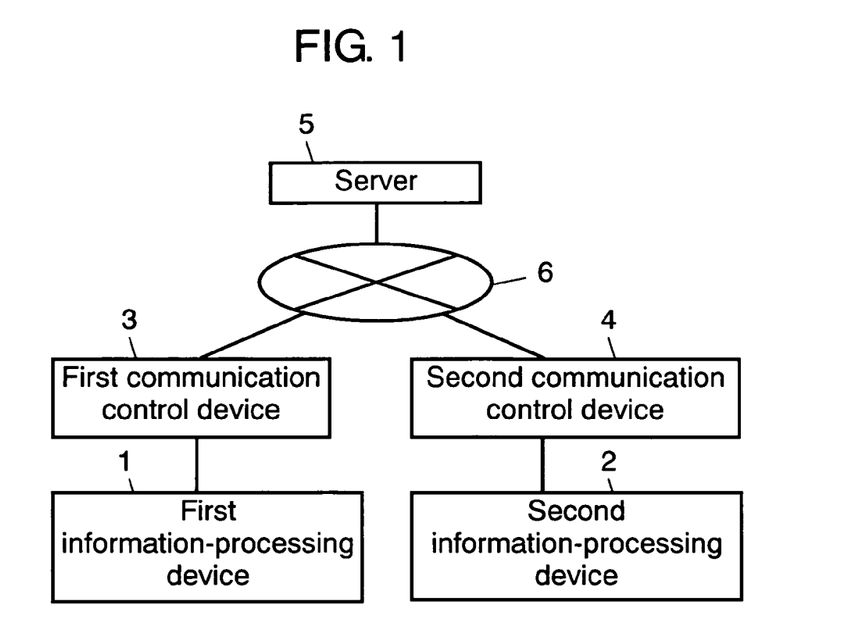
FIG. 1 illustrates the configuration of a communication system according to an embodiment of the present invention.

FIG. 1 illustrates the configuration of the communication system according to the embodiment. In FIG. 1, the communication system according to the embodiment is equipped with first information-processing device 1, second information-processing device 2, first communication control device 3, second communication control device 4, and server 5. First communication control device 3, second communication control device 4, and server 5 are connected one another through wired or wireless communication line 6. One example of this communication line 6 is the Internet.

Here, FIG. 1 shows the case where only first information-processing device 1 and second information-processing device 2 are connected to first communication control device 3 and second communication control device 4, respectively. However, a device other than these may be connected to first communication control device 3 and/or second communication control device 4.

Still, FIG. 1 shows the case where one first communication control device 3 and one second communication control device 4 are connected to first information-processing device 1 and second information-processing device 2, respectively. However, multiple-stage communication control devices may be connected to each information-processing device. In other words, other communication control devices may exist from first information-processing device 1 and second information-processing device 2, to communication line 6.

Further, in this embodiment, a description is made for the case where first information-processing device 1 operates as an information-processing device at the communication source; and second information-processing device 2, at the communication destination. Here, an information-processing device at the communication source refers to a device that transmits a communication (connection) request in establishing communications between first information-processing device 1 and second information-processing device 2. In other words, it is a device that transmits bubble packets. Meanwhile, an information-processing device at communication destination refers to the opposite information-processing device, namely a device that receives the communication request. In other words, it is a device that transmits a packet for replying to a bubble packet. Here, establishing communications refers to starting peer-to-peer communications, not via server 5, between first information-processing device 1 and second information-processing device 2. Still, a description is hereinafter made for a bubble packet and a reply packet.

Figure 2:
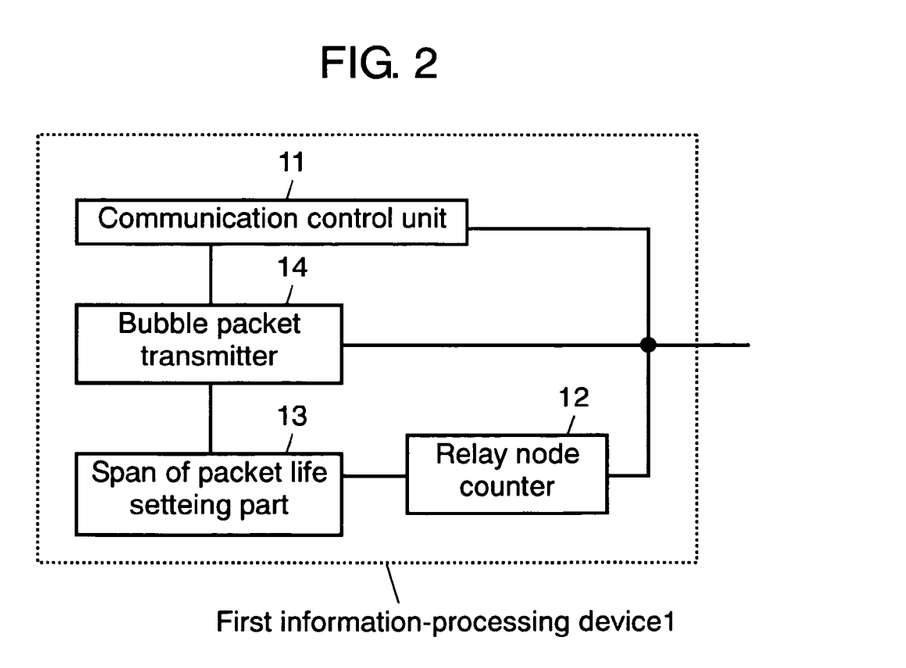
FIG. 2 is a block diagram illustrating the configuration of a first information-processing device according to the embodiment.

FIG. 2 is a block diagram illustrating the configuration of first information-processing device 1. In FIG. 2, first information-processing device 1 is equipped with communication control unit 11, relay node counter 12, span of packet life setting part 13, and bubble packet transmitter 14.

Communication control unit 11 performs a process for establishing communications between first information-processing device 1, and second information-processing device 2 at the communication destination. Further details about the process are to be hereinafter described.

Relay node counter 12 counts the number of relay nodes from first information-processing device 1. Here, a relay node refers to a so-called router having a routing function, and may optionally have an address conversion function (e.g. a function of converting from a private address to a global address). Additionally, the relay node may relay packets from a global address to another (performed in the Internet, for example); from a private address to another (performed in a LAN, for example); or between a private address and a global address (performed between a LAN and the Internet, for example). The counting of relay nodes may be performed with traceroute, or by transmitting UDP packets with a TTL (Time To Live) being set, incremented from one in order. In this embodiment, relay nodes are to be counted with traceroute. Further details about the process are to be hereinafter described.

Span of packet life setting part 13 sets a span of packet life in a range where a bubble packet transmitted by bubble packet transmitter 14 does not reach second communication control device 4 at the communication destination. Span of packet life setting part 13 sets a span of packet life based on the relay node count counted by relay node counter 12. The setting of a span of packet life is performed by setting a TTL related to the bubble packet, for example. Here, the life of a bubble packet to be set by span of packet life setting part 13 must be one with which the bubble packet can pass through the source communication control device (all the communication control devices if multiple-stage). This is because the source communication control device cannot receive a reply packet from the destination if the bubble packet does not pass through the source communication control device, as a bubble packet has a role in leaving a transmission history in the source communication control device so as to receive a reply packet from the destination.

Span of packet life setting part 13 may, for example, set a life of a bubble packet so that the bubble packet can reach a relay node that relays packets from a global address to another; so that the bubble packet can reach the relay node closest to first information-processing device 1 at the communication source, among relay nodes that relay packets from a global address to another; or so that the bubble packet can reach a relay node located before second communication control device 4 at the communication destination. Still, for multiple-stage communication control devices at the communication destination, the life of a bubble packet may be set so that the bubble packet reaches a relay node located before the communication control device closest to the communication source. (In other words, the bubble packet reaches none of the communication control devices at the communication destination.)

Bubble packet transmitter 14 transmits a bubble packet having a life set by span of packet life setting part 13, through first communication control device 3 at the communication source. Here, a bubble packet refers to a packet transmitted from first information-processing device 1 at the communication source, for leaving a transmission history in first communication control device 3 at the communication source, so that first communication control device 3 can accept a reply packet transmitted from second information-processing device 2 at the communication destination. Leaving a transmission history refers to allocating (i.e. opening) a port for accepting a reply packet. This bubble packet may optionally contain some information (including dummy information). However, a bubble packet according to this embodiment does not generally include significant information because the packet does not reach the destination. Bubble packet transmitter 14 transmits a bubble packet stored in a given memory, for example. This bubble packet is transmitted with a connectionless protocol such as UDP (User Data Protocol).

Second information-processing device 2 transmits a reply packet for a bubble packet transmitted from first information-processing device 1. This results in establishing communications between first information-processing device 1 and second information-processing device 2 through first communication control device 3 and second communication control device 4. Here, a reply packet refers to a packet to be transmitted to a port of first communication control device 3 that the bubble packet has passed through. As a result that the bubble packet has been transmitted in advance, first information-processing device 1 can receive this reply packet through first communication control device 3. The reply packet may optionally contain some information.

First communication control device 3 has a NAT (Network Address Translation) function, which converts the address for a packet transmitted from first information-processing device 1, or for one transmitted to first information-processing device 1. Specifically, it performs mutual conversion between a local address used at first information-processing device 1 and a global address used at communication line 6. This first communication control device 3, having a routing function, is included in relay nodes counted by relay node counter 12. Here, first communication control device 3 may have functions other than address conversion.

Second communication control device 4 is the same as first communication control device 3, also having a NAT function for address conversion.

Still, the transmission port allocation rule and intercepting filter rule used in first communication control device 3 and second communication control device 4 are employed not only when transmission of a bubble packet is required for establishing communications between first information-processing device 1 and second information-processing device 2. In this embodiment, however, a description is made for the case where Cone type is used as the transmission port allocation rule, and Address Sensitive filter is used as the intercepting filter rule, for first communication control device 3 and second communication control device 4. In other words, first communication control device 3 and second communication control device 4 are assumed to have so-called Restricted Cone NAT function.

Server 5 performs processes required to establish communications between first information-processing device 1 and second information-processing device 2, not via server 5. Such processes include notifying first information-processing device 1 of an IP address of second information-processing device 2 (strictly, second communication control device 4), at communication line 6; and notifying second information-processing device 2 of a port number of first communication control device 3 through which a bubble packet transmitted from first information-processing device 1 has passed.

Next, a description is made for a method with which relay node counter 12 counts relay nodes. Here, a method of counting relay nodes using traceroute is described. Traceroute can provide an IP address of each relay node located through the destination by tracing the route that a bubble packet has followed.

Figure 3:
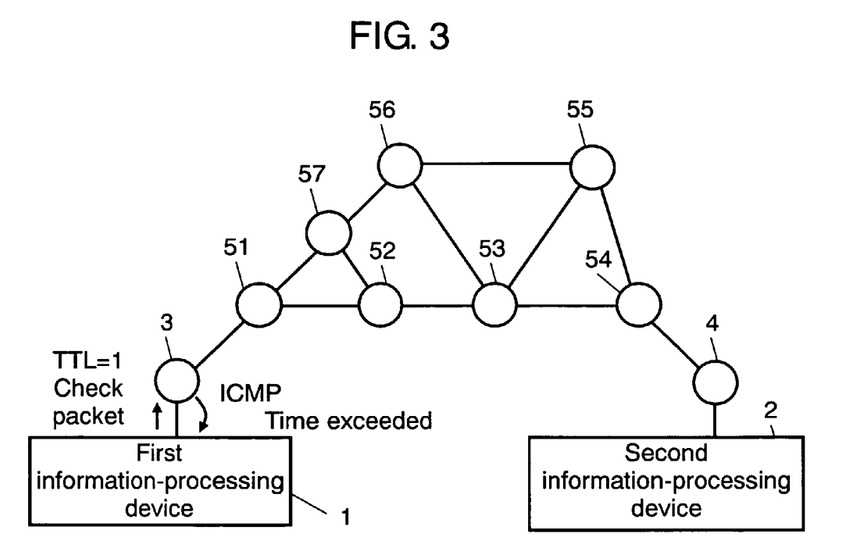
FIG. 3 illustrates traceroute according to the embodiment.
Figure 4:
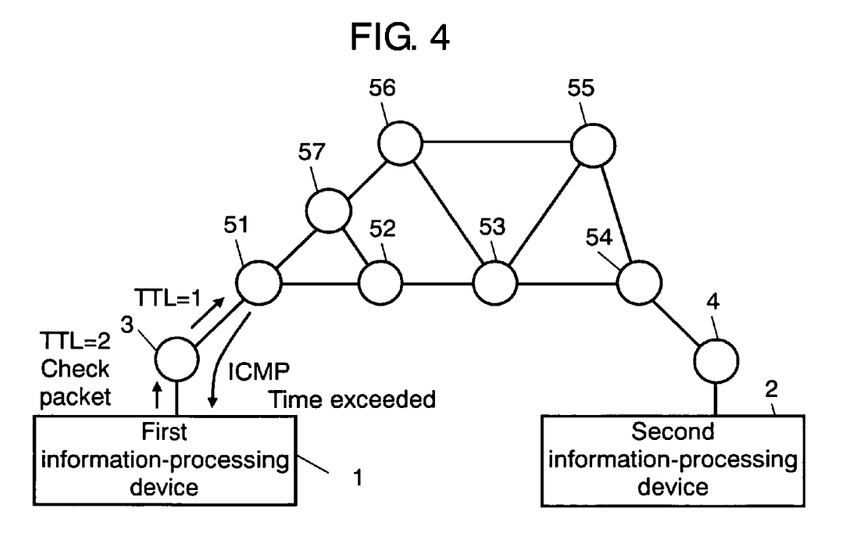
FIG. 4 is another diagram illustrating the traceroute according to the embodiment.

FIGS. 3 and 4 illustrate traceroute. In these figures, a relay node is shown with a circle. First, as shown in FIG. 3, relay node counter 12 of first information-processing device 1 transmits a check packet with TTL=1 to second communication control device 4. Here, a check packet refers to a packet transmitted to a transmission destination in traceroute. A TTL (Time To Live) is set to this check packet. The TTL of the check packet decrements by one every time the packet passes through a relay node. Therefore, the TTL of the check packet changes from TTL=1 to TTL=0 when reaching first communication control device 3, and then the check packet is returned from first communication control device 3 to first information-processing device 1, due to ICMP Time Exceeded. Next, as shown in FIG. 4, relay node counter 12 transmits a check packet with TTL=2 to second communication control device 4. Consequently, the TTL of the check packet becomes TTL=0 at relay node 51, and then the check packet is returned from relay node 51 to first information-processing device 1 due to ICMP Time Exceeded. This enables relay node counter 12 to learn the IP address of relay node 51. In this way, as a result that transmitting a check packet and receiving ICMP Time Exceeded are repeated with the TTL incremented by 1, until the check packet reaches second communication control device 4, an IP address can be known of each relay node through which the check packet has passed until reaching second communication control device 4. Here, for a relay node that does not return ICMP Time Exceeded, relay node counter 12 transmits a next check packet after time-out. When the check packet reaches second communication control device 4, ICMP Port Unreachable is returned and the traceroute ends. Here, in some cases, ICMP Echo Reply is returned instead of ICMP Port Unreachable. Relay node counter 12 can learn the number of relay nodes that the check packet has passed through before reaching second communication control device 4, and the IP addresses of the respective relay nodes.

Here, the description is made for the case where traceroute is performed for second communication control device 4. However, relay node counter 12 may count relay nodes with a method other than traceroute, and the transmission destination of a check packet may be a device other than second communication control device 4, such as server 5.

Figure 5:
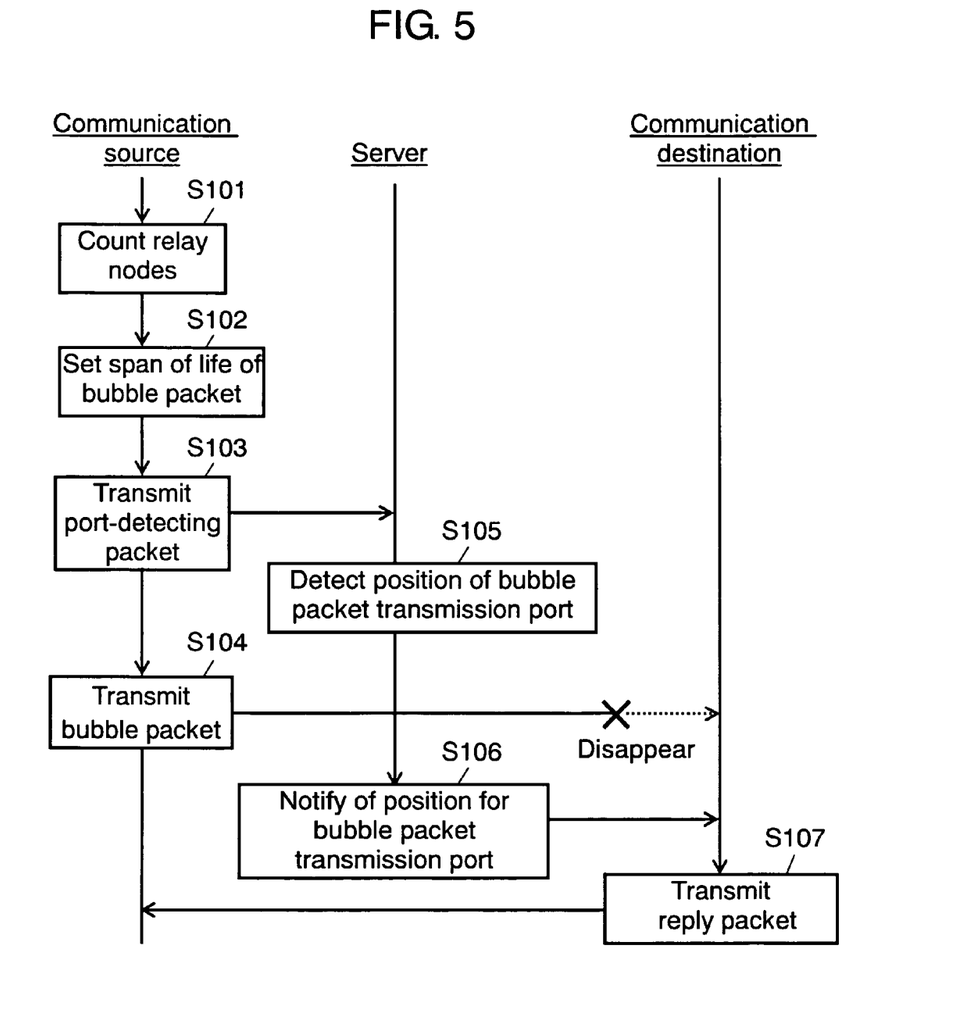
FIG. 5 illustrates the operations of the communication system according to the embodiment.

Next, a description is made for the operations of establishing communications between first information-processing device 1 and second information-processing device 2 in a communication system according to the embodiment, using FIG. 5. Here, in this description, first information-processing device 1 and second information-processing device 2 are assumed to know in advance the IP addresses at communication line 6, of first communication control device 3 and second communication control device 4, with the intermediation of server 5.

(Step S101) Relay node counter 12 counts relay nodes located through second communication control device 4.

(Step S102) Span of packet life setting part 13 sets a life of a bubble packet transmitted by bubble packet transmitter 14, based on the relay node count by relay node counter 12.

(Step S103) Communication control unit 11 transmits a port-detecting packet to server 5. This port-detecting packet is transmitted before a bubble packet is transmitted, in order to detect the position (identified by a port number, for example) of the port (hereinafter, referred to as "bubble packet transmission port") in first communication control device 3 to which a bubble packet is transmitted. The port-detecting packet is received by server 5.

(Step S104) Bubble packet transmitter 14 transmits a bubble packet having a span of packet life set by span of packet life setting part 13, to second communication control device 4. This bubble packet, disappearing after the set span of packet life expires, does not reach second communication control device 4. Here, this bubble packet is directly transmitted to second communication control device 4, not via server 5.

(Step S105) Server 5 detects a position of the bubble packet transmission port by means of the port-detecting packet transmitted in step S103.

(Step S106) Server 5 notifies second information-processing device 2 of the position of the bubble packet transmission port detected in step S105.

(Step S107) Second information-processing device 2 transmits a reply packet to the bubble packet transmission port of first communication control device 3. As a result that this reply packet is received by first information-processing device 1, communications are to be established between first information-processing device 1 and second information-processing device 2, not via server 5.

Figure 6:
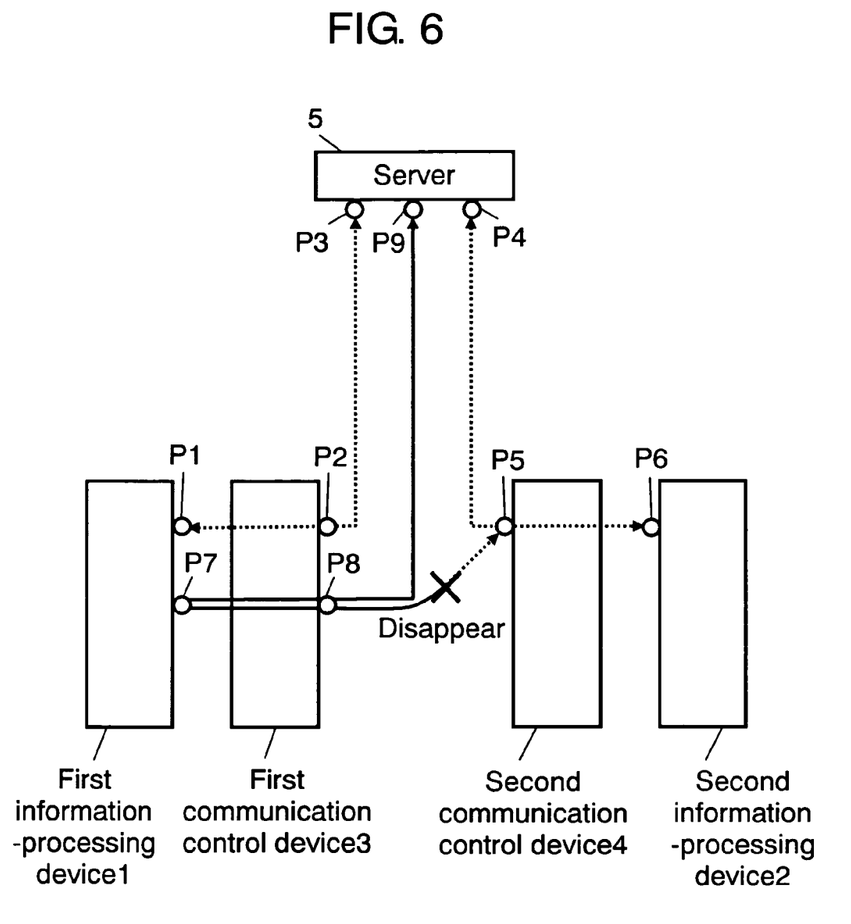
FIG. 6 illustrates a concrete example of the communication system according to the embodiment.
Figure 7:
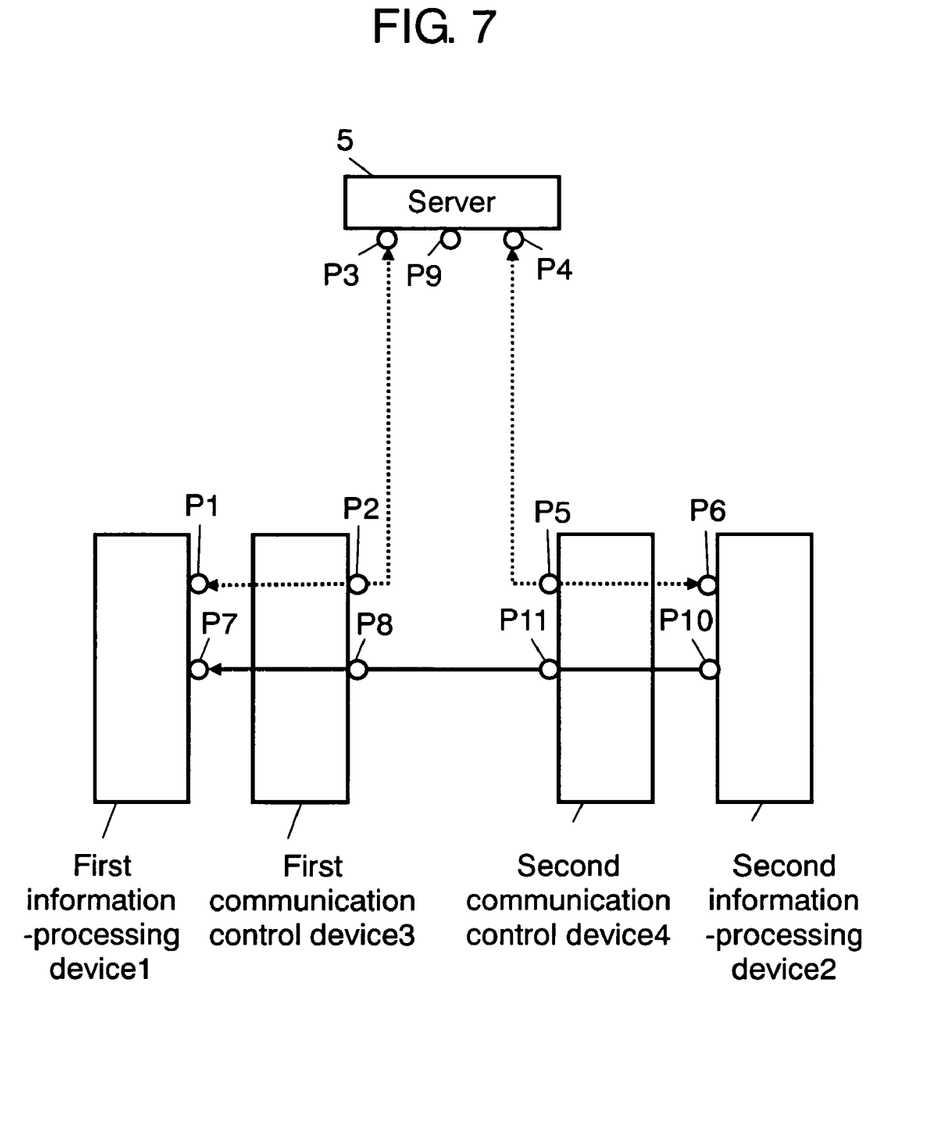
FIG. 7 is another diagram for illustrating the concrete example of the communication system according to the embodiment.

Next, a description is made for the operations of this communication system, using a concrete example. In this example, first communication control device 3 and second communication control device 4 are assumed to have Restricted Cone NAT function, as mentioned above. Further, relay node counter 12 is assumed to count relay nodes with traceroute. Still, span of packet life setting part 13 is assumed to set a span of packet life by setting a TTL of a bubble packet. Moreover, the respective IP addresses at communication line 6, of first communication control device 3, second communication control device 4, and server 5 are assumed to be as follows:

First communication control device 3: 202.132.10.6
Second communication control device 4: 131.206.10.240
Server 5: 155.32.10.10

FIGS. 6 and 7 illustrate this concrete example. In this example, a connection request is assumed to be made from first information-processing device 1. In FIG. 6, first information-processing device 1, knowing the IP address of server 5: "155.32.10.10" in advance, transmits the device ID of first information-processing device 1: "1234567890" to the server 5. Here, a GUID (Global Unique ID) such as a MAC address can be used as this device ID. The device ID is transmitted from port P1 of first information-processing device 1 to port P3 of server 5 through port P2 allocated by first communication control device 3. This transmission allows server 5 to learn the device ID of first information-processing device 1, the IP address of first communication control device 3: "202.132.10.6", and the port number of port P2 in first communication control device 3: "10034", all retained in server 5.

Second information-processing device 2, in the same way as first information-processing device 1, transmits the device ID of second information-processing device 2: "9876543210". Consequently, server 5 retains the IP address of second communication control device 4: "131.206.10.240", the device ID of second information-processing device 2, and the port number of port P5 in second communication control device 4: "23495".

Next, first information-processing device 1 transmits to server 5 the device ID: "9876543210" of second information-processing device 2 with which connection is requested, to request connection with second information-processing device 2. Then, server 5 receives the connection request and notifies first information-processing device 1 of the IP address of second communication control device 4: "131.206.10.240" and the port number of port P5: "23495" through port P2.

Relay node counter 12 of first information-processing device 1, by executing traceroute for the IP address of second communication control device 4: "131.206.10.240", counts relay nodes located through second communication control device 4 (step S101). This counting is performed in the same way as in the description using FIGS. 3 and 4. Then, relay node counter 12 passes to span of packet life setting part 13, the number of relay nodes located through second communication control device 4, and the correspondence of the values of TTL to the respective relay nodes through which the packet has passed before reaching second communication control device 4, and the IP addresses that have been returned from the relay nodes, as count results.

Span of packet life setting part 13, when receiving the number of relay nodes as a count result made by relay node counter 12, sets a TTL of a bubble packet so that the bubble packet reach the nearest (closest to first communication control device 3) relay node the global address of which is the IP address returned from the relay node due to ICMP Time Exceeded (step S102). Specifically, among the TTLs corresponding to the global address returned from relay nodes, the smallest TTL is set as the TTL of the bubble packet. Setting a span of packet life in this way results in the bubble packet with its life being set so as to reach the nearest relay node among those relaying packets from a global address to another. Here, it is assumed that the second relay node from first information-processing device 1 is a relay node that relays packets from a global address to another, and the TTL has been set as TTL=2.

Communication control unit 11 transmits a port-detecting packet for detecting a bubble packet transmission port, from port P7 of first information-processing device 1 to port P9 of server 5 (step S103). Port P9 is assumed to be one specified by server 5. Here, this port P9 may be identical to port P3. This port-detecting packet is transmitted using port P8 (port number: "10040") newly allocated by first communication control device 3. This port-detecting packet is received by server 5, and the port number of port P8 in first communication control device 3: "10040" is detected and retained (step S105).

Bubble packet transmitter 14 transmits a bubble packet with TTL=2 toward port P5 of second communication control device 4 (step S104). The TTL of this bubble packet is decremented by one at first communication control device 3 to become TTL=1, decremented by one at the relay node next to first communication control device 3 to become TTL=0, and disappears. Therefore, the bubble packet does not reach second communication control device 4.

Server 5 notifies second information-processing device 2 of the retained port number of bubble packet transmission port P8: "10040", and the IP address of first communication control device 3: "202.132.10.6", through port P5 (step S106).

Second information-processing device 2, when receiving the IP address of first communication control device 3 and the port number of port P8, transmits a reply packet from port P10 toward the IP address and port number. (Refer to FIG. 7.) The reply packet is accepted by port P8 of first communication control device 3, and then passed to port P7 of first information-processing device 1. In this way, communications are established between first information-processing device 1 and second information-processing device 2, and after that, first information-processing device 1 and second information-processing device 2 can perform operations such as transmitting and receiving desired data.

In this concrete example, the description is made for the case where span of packet life setting part 13 sets a span of packet life so that a bubble packet can reach the relay node closest to first information-processing device 1 (namely, the relay node next from first communication control device 3) at the communication source, among the relay nodes that relay packets from a global address to another. However, this is just one example, and as mentioned above, span of packet life setting part 13 may set a span of packet life so that the bubble packet can reach a relay node that relays packets from a global address to another, or alternatively so that the bubble packet reaches a relay node located before second communication control device 4 at the communication destination.

Some relay nodes possibly do not comply with ICMP. Specifically, some relay nodes possibly decrease the TTL of a UDP bubble packet, although they do not decrease the TTL in traceroute. If such a relay node is included in the source communication control device, even if a bubble packet is transmitted having a span of packet life able to reach the nearest relay node that relays packets from a global address to another, based on the count result made by relay node counter 12, the bubble packet actually ends up in failing to pass through all the communication control devices at the source. Consequently, a transmission history does not remain in the communication control device closest to the transmission destination among the communication control devices at the source, disabling a reply packet transmitted from second information-processing device 2 to be accepted. In order to avoid such a situation, a span of packet life may be set so that the bubble packet reaches a relay node beyond the nearest relay node that relays packets from a global address to another; or alternatively so that the bubble packet reaches any one relay node located through the relay node just before the communication control device at the destination.

Further, span of packet life setting part 13 may set a span of packet life with increasing relay nodes that a bubble packet can reach every time bubble packet transmitter 14 transmits a bubble packet, until communications are established between first information-processing device 1 at the communication source and second information-processing device 2 at the destination. Specifically, the following operations may be repeated. That is, first, a life of a bubble packet is set in advance so that the bubble packet reaches the nearest relay node that relays packets from a global address to another. Then, if the transmitting of the bubble packet fails to establish communications between the information-processing devices, the next bubble packet is transmitted with its span of packet life (TTL) incremented by one. If even this operation fails to establish communications between the information-processing devices, the span of packet life is further incremented by one to try to establish communications. Here, if failing to establish communications, the span of packet life may be set by increasing relay nodes one by one that a bubble packet can reach; or alternatively, by increasing relay nodes by a given number (The number may vary depending on the timing for increasing), that a bubble packet can reach.

As mentioned above, in a communication system according to this embodiment, as a result that a bubble packet that first information-processing device 1 transmits is provided with a span of packet life to prevent the packet from reaching second communication control device 4, the bubble packet does not reach second communication control device 4, even if such second communication control device 4 is used that any packet from the source is not accepted, when receiving a packet that cannot be accepted due to the intercepting filter rule. Accordingly, communications can be appropriately established between first information-processing device 1 and second information-processing device 2 after transmitting the bubble packet.

Further, as a result that a life of a bubble packet is set in advance so that the bubble packet disappears when reaching the relay node closest to the source among the relay nodes that relay packets from a global address to another, the situation can be avoided in which the communication traffic increases due to bubble packets having only a role in leaving a transmission history in first communication control device 3 at the communication source.

Here, in this embodiment, the description is made for the case where relay node counter 12 counts relay nodes, and span of packet life setting part 13 sets a life of a bubble packet based on the count result. However, span of packet life setting part 13 may set a life of a bubble packet based on the number of stages of the source communication control devices, externally input, where first information-processing device 1 is not equipped with relay node counter 12. As shown in FIG. 1, if only one stage of first communication control device 3 at the source is provided, for example, span of packet life setting part 13 may set a life of a bubble packet by setting "2", which is "1" added to the number of stages of the communication control device: "1", as its TTL.

Figure 8:
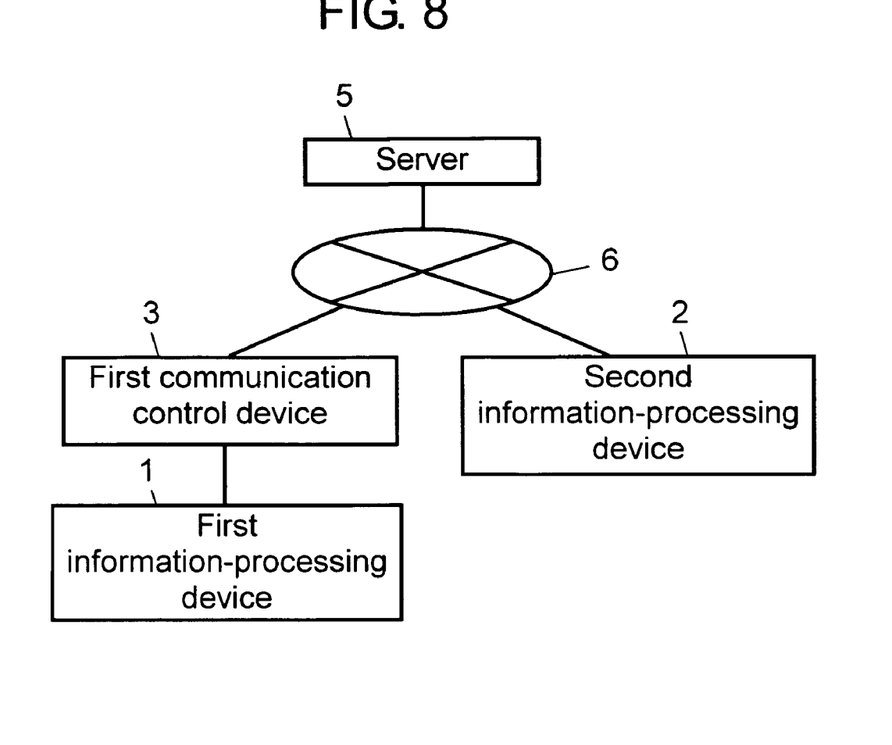
FIG. 8 shows another example for the configuration of the communication system according to the embodiment.

Meanwhile, in this embodiment, the description is made for the case where second information-processing device 2 at the communication destination also has a communication control device. However, as shown in FIG. 8, the communication destination may be configured without a communication control device. In this case, span of packet life setting part 13 sets a life of a bubble packet in a range where the packet does not reach second information-processing device 2 at the communication destination. This setting allows avoiding the situation where the communication traffic increases. This is especially prominent when span of packet life setting part 13 sets a life of a bubble packet so that the bubble packet can reach the nearest relay node that relays packets from a global address to another.

Further, in this embodiment, the description is made for the case where the communication control device has Restricted Cone NAT function. However, the communication control device may have another type of NAT. That is, setting a span of packet life to a bubble packet can be employed in an information-processing device that transmits a bubble packet through an arbitrary type of NAT. Here, when a different type of NAT is used, a different process may be used for establishing communications according to the type of the NAT.

Further, in counting relay nodes by means of relay node counter 12, the description is made, in this embodiment, for the case of counting relay nodes located through second communication control device 4, which is a destination NAT. However, when span of packet life setting part 13 sets a span of packet life so that a bubble packet can reach the nearest relay node that relays packets from a global address to another, for example, counting may be performed for relay nodes located through server 5 or another server.

Further, in counting relay nodes by means of relay node counter 12, the description is made, in this embodiment, for the case of counting all the relay nodes located through a given destination node (e.g. second communication control device 4) by means of traceroute. However, when span of packet life setting part 13 sets span of packet life so that a bubble packet can reach the nearest relay node that relays packets from a global address to another, for example, counting may be performed for relay nodes located beyond the source communication control device (all the communication control devices if multiple-stage). When span of packet life setting part 13 sets span of packet life so that a bubble packet can reach the nearest relay node that relays packets from a global address to another, for example, the counting may end at the nearest relay node that relays packets from a global address to another. Specifically, when a span of packet life is being transmitted to a UDP packet, with the TTL being incremented in order, the counting may end when the IP address of a relay node that has returned ICMP Time Exceeded begins including a global address. Here, span of packet life setting part 13 may set the TTL that has been set in the UDP packet when returning the global address, as the life of the bubble packet.

Further, in this embodiment, the description is made for the case where setting of a life of a bubble packet is made by setting a TTL. However, other methods may be used. A span of packet life may be set to a bubble packet by setting the time of day at transmitting and the time showing a span of packet life. In this case, when a relay node determines that the time showing a span of packet life has elapsed from the time of day at transmitting, the bubble packet is to be discarded.

Further, in this embodiment, the description is made that first communication control device 3 and second communication control device 4 have a NAT function. However, first communication control device 3 and second communication control device 4 may have a firewall function with packet filtering instead of or in addition to a NAT function. Here, packet filtering refers to a function such as selecting receive packets according to the aforementioned intercepting filter rule.

If first communication control device 3 has such a firewall function based on an intercepting filter rule, as a result that a transmission history is left in first communication control device 3 through transmitting a bubble packet from the local side (first information-processing device 1) to the global side (communication line 6), first communication control device 3 begins accepting a reply packet transmitted to the bubble packet transmission port. In addition, if second communication control device 4 receives a packet that is not accepted due to the intercepting filter rule, as a result that a span of packet life with which a bubble packet does not reach second communication control device 4 at the communication destination is set, communications can be appropriately established between first information-processing device 1 and second information-processing device 2, even if second communication control device 4 has such a firewall function that refuses any packet from its communication source.

Still, if first communication control device 3 and second communication control device 4 are configured with hardware separately with the information-processing device, and have a firewall function instead of a NAT function, these communication control devices are to have a routing function, and thus generally can be relay nodes that decrement the TTL by one. In this case, as a result that a life of a bubble packet is set so that a bubble packet can reach a relay node that relays packets from a global address to another, for example, a transmission history can be left also in the firewall (communication control device), and thus first information-processing device 1 can accept a reply packet transmitted from second information-processing device 2.

Meanwhile, if first information-processing device 1 and second information-processing device 2 implement a firewall function with application software, the TTL is not decremented by one as a result that a bubble packet passes through the firewall (communication control device). (In this case, the information-processing device and the communication control device are configured as a unit, and only the function of the communication control device (firewall) is separately specified in FIG. 1.) In this case, a transmission history can be left in the firewall as a result that a bubble packet with its TTL of one or larger is transmitted. Still, even if a communication control device having a NAT function further exists at the global side (communication line 6) of this firewall, as a result that a life of a bubble packet is set so that the bubble packet can reach a relay node that relays packets from a global address to another, a transmission history can be left also in the communication control device having a NAT function, and thus first information-processing device 1 can accept a reply packet transmitted from second information-processing device 2.

Here, as shown in FIG. 8, the following are the same as the mentioned above, even for the case of having a firewall function instead of or in addition to a NAT function. That is, second communication control device 4 can be dispensed with, and the number of stages for communication control device at the communication source may be externally input.

Further, in this embodiment, the description is made for the case where server 5 is identified by an IP address. However, server 5 may be identified by a domain name (e.g. "server.pana.net"). In this case, server 5 can be identified as a result that the domain name is converted to an IP address by means of a DNS server.

Further, the communication protocol according to the embodiment may be IPv4 (Internet Protocol version 4) or IPv6 (Internet Protocol version 6), for example.

Further, in the above-mentioned embodiment, each process (each function) may be implemented with centralized processing by means of a single device (system), or with distributed processing by a plurality of devices.

Further, in the above-mentioned embodiment, each component may be composed of dedicated hardware, or implemented by executing programs for components feasible with software. Each component can be implemented as a result that a program executing part such as a CPU reads and executes software programs recorded in a recording medium such as a hard disk or semiconductor memory. Here, software that implements an information-processing device according to the above-mentioned embodiment is a following program. That is to say, this program has a computer transmit bubble packets in an information-processing device at a communication source that communicates with an information-processing device at an communication destination through communication control device at a communication source. The program has a computer execute a span of packet life setting step and a bubble packet transmission step. The span of packet life setting step sets a span of packet life with which a bubble packet transmitted from the information-processing device at the communication source for leaving a transmission history in the source communication control device does not reach a destination information-processing device. The bubble packet transmission step transmits the bubble packet having the span of packet life that has been set in the span of packet life setting step.

Here, in the above-mentioned program, the transmission step for transmitting packets and other steps do not include a process performed by hardware such as one performed by a modem or interface card in the transmission step (a process performed only by hardware).

Further, this program may be executed by being downloaded from a server or the like, or by reading a program recorded in a given recording medium (e.g. optical disc such as a CD-ROM, magnetic disk, semiconductor memory).

Further, this program may be executed by a single computer or multiple computers. In other words, either centralized processing or distributed processing may be used.

INDUSTRIAL APPLICABILITY

As mentioned above, the information-processing device and the like according to the present invention set a span of packet life to a bubble packet in a range where the bubble packet does not reach an information-processing device or communication control device at the communication destination, useful to an information-processing device and others that transmit bubble packets in establishing communications between information-processing devices.

The invention claimed is:

1. An information-processing device at a communication source, that communicates with an information-processing device at a communication destination through a communication control device at the communication source, comprising:
   a relay node counter that counts a number of relay nodes from the information-processing device at the communication source to a relay node relaying packets from a global address to an another global address;
   a span of packet life setting part including a processor that sets a span of packet life of a bubble packet to be transmitted from the information-processing device at the communication source in order to open a port of the communication control device at the communication source, so that the bubble packet can reach the relay node relaying the packets from the global address to the another global address, based on the number of relay nodes counted by the relay node counter; and
   a bubble packet transmitter that transmits the bubble packet having the span of packet life that the span of packet life setting part has set, through the communication control device at the communication source,
   a communication control unit configured to receive a reply packet from the information processing device at the communication destination via the opened port of the communication control device at the communication source.

2. The information-processing device as claimed in claim 1, wherein
   communication between the information-processing device at the communication destination and the information-processing device at the communication source is performed through a communication control device at the communication destination; and wherein
   the span of packet life setting part sets a span of packet life in a range in which the bubble packet does not reach the communication control device at the communication destination.

3. The information-processing device as claimed in claim 2, wherein
   the span of packet life setting part sets a span of packet life with which the bubble packet can reach a relay node located before the communication control device at the communication destination.

4. The information-processing device as claimed in claim 1, wherein
   the span of packet life setting part sets a span of packet life so that the bubble packet can reach a relay node closest to the information-processing device at the communication source, out of relay nodes that relay packets from a global address to another global address.

5. The information-processing device as claimed in claim 1, wherein
   the span of packet life setting part sets a span of packet life with increasing the number of relay nodes that the bubble packet can reach, by one every time the bubble packet transmitter transmits a bubble packet, until communication is established between the information-processing device at the communication source and the information-processing device at the communication destination.

6. The information-processing device as claimed in claim 1, wherein
   the span of packet life setting part sets a Time To Live (TTL) for the bubble packet.

7. The information-processing device as claimed in claim 1, wherein
   the relay node counter counts the number of relay nodes with trace route.

8. The information-processing device according to claim 1 wherein the communication control unit transmits a port-detecting packet for notifying a server which intermediates communication to the information-processing device at the communication destination, of a global IP address and a port number through which the bubble packet, transmitted from the information-processing device at the communication source, passed the communication control device at the communication source.

9. The information-processing device according to claim 8, wherein the communication control unit receives a reply packet from the information-processing device at the communication destination to which the global IP address and the port number of the information-processing device at the communication source is notified, so that communication between the information-processing device at the communication source and the information-processing device at the communication destination bypassing the server is established.

10. A method of transmitting a bubble packet in an information-processing device at a communication source that communicates with an information-processing device at a communication destination through a communication control device at the communication source, comprising:
    counting, a number of relay nodes from the information-processing device at the communication source to a relay node relaying packets from a global address to an another global address;
    setting, a span of packet life of a bubble packet to be transmitted from the information-processing device at the communication source in order to leave a transmission history in the communication control device at the communication source, so that the bubble packet can reach the relay node relaying the packets from the global address to the another global address, based on the number of relay nodes counted by the counting step;
    transmitting the bubble packet having the span of packet life that the setting step has set through the communication control device at the communication source;
    opening, by the communication control device at the communication source, a port of the communication control device at the communication source to accept a reply packet from the information-processing device at the communication destination responsive to sending the bubble packet; and receiving, by the information-processing device at the communication source, the reply packet from the information-processing device at the communication destination via the opened port of the communication control device at the communication source.

11. The method according to claim 10, further comprising transmitting, by a communication control unit, a port-detecting packet for notifying a server which intermediates communication to the information-processing device at the communication destination, of a global IP address and a port number through which the bubble packet transmitted from the information-processing device at the communication source passed the communication control device at the communication source.

12. The method according to claim 10, further comprising:

transmitting a port-detecting packet to notify a server which intermediates communication to the information-processing device at the communication destination, of the global IP address and the port number through which the bubble packet, transmitted from the information-processing device at the communication source, passed the communication control device at the communication source;

receiving, by the communication control device of the communication source, the reply packet from the information-processing device at the communication destination to which the global IP address and the port number of the information-processing device at the communication source is notified; and establishing communication between the information-processing device at the communication source and the information-processing device at the communication destination bypassing the server.

\* \* \* \* \*